United States Patent [19]

Malinowski et al.

[11] 4,296,818
[45] Oct. 27, 1981

[54] ROTARY ROCK PICKER

[75] Inventors: Leon Malinowski; Kenneth Lange, both of Yorkton, Canada

[73] Assignee: Leon's Manufacturing Co., Ltd., Saskatchewan, Canada

[21] Appl. No.: 28,661

[22] Filed: Apr. 10, 1979

[30] Foreign Application Priority Data

Jan. 16, 1979 [CA] Canada .................................. 319699

[51] Int. Cl.³ .............................................. A01B 43/00
[52] U.S. Cl. ...................................... 171/63; 171/144
[58] Field of Search ....................... 171/63, 64, 65, 85, 171/95, 116, 128

[56] References Cited

U.S. PATENT DOCUMENTS

| 1,276,915 | 8/1918 | Hinkle | 56/400.16 |
| 3,443,644 | 5/1969 | Schindelka | 171/63 |
| 3,599,724 | 8/1971 | Fraske | 171/63 |
| 4,040,489 | 8/1977 | Hulicsko | 171/63 |

FOREIGN PATENT DOCUMENTS 711006 6/1965 Canada ................................. 171/63

Primary Examiner—Robert A. Hafer
Attorney, Agent, or Firm—Burns, Doane, Swecker & Mathis

[57] ABSTRACT

A rock picking apparatus has a fork and reel assembly and a stone bucket. The reel assembly includes side plates supporting batts which are biased to an operative position by compression springs.

4 Claims, 5 Drawing Figures

ROTARY ROCK PICKER

This invention relates to an apparatus for gathering articles such as stones lying on or embedded in the ground and in particular to a rotary rock picker for carrying out this function.

Known rock picking devices usually comprise a mobile frame supporting a stone bucket and a fork and reel assembly positioned ahead of the bucket, the reel having a series of rotatable rakes adapted to assist in dislodging stones from the ground surface together with the grate portion of the fork and, because of the rotary action, to transfer those stones rearwardly into the stone bucket. Conventionally, the rakes or batts of the rotary reels extend across the width of the fork and have legs which are pivotally mounted to side plates of the reel. The rakes are held in an attack position by springs interconnecting the legs with the side plates, solid mechanical stop members being used in conjunction with the free end of the legs to limit the arc of operation of the legs and rakes applied by the springs. An example of such a conventional arrangement is shown in Canadian Pat. No. 984,615 of Mar. 2, 1976.

There are several disadvantages to the conventional form of fork and reel assembly. Firstly, the side plates must be of substantial size because of the poor mechanical advantage between the usual small highly stressed tension springs and the pivot point of the associated leg. Because of the large side plates, the ground-to-reel center clearance is fairly small causing jamming of rocks and stones between the grate and the reel side plates. Additionally, the spring hooks wear rapidly on conventional designs as do the solid metal stop members and the pivot points resulting from high impact forces on recoil of the rakes under the spring tension.

The rock picking apparatus of the present invention provides important improvements over the abovementioned conventional designs using, in one embodiment, a relatively small size of reel side plates in combination with springs under compression between the side plate and the trailing portion of the rake or batt. This provides a better mechanical advantage of the spring on the batt so that the line of action of the spring force is at a substantial distance from the batt pivot point. A large deflection, reasonably stressed spring under compression is used resulting in improved rock picking force at the batt tip. No hooks or mechanical stops are used for the spring, a preferred embodiment using rubber or like cushion members to absorb recoil shock of the compression springs. A large ground-to-reel center clearance is made possible by use of the smaller reel side plates thereby eliminating jamming of the rocks and stones between the grate and the reel side plates.

In another embodiment, the reel side plates are larger but the compression spring is substantially heavier and greater in length than that of the batt leg so as to apply a substantially greater force to the batts to move large stones from the grate into the stone storage bucket.

According to a broad aspect, the invention relates to a rock picking apparatus comprising a mobile frame with a fork and reel assembly on the frame for picking rocks from the ground and a dumpable stone storage bucket mounted on the frame behind the fork. The reel includes a pair of spaced side plates, journalled for rotation in the fork assembly, and supporting between them a plurality of rakes. Each rake has a pair of spaced legs pivotally mounted to the side plates and compression spring means interconnects the trailing sides of the rakes to the side plates and biases the rakes to an operative position.

The invention is illustrated by way of example in the accompanying drawings in which.

Figure 1:
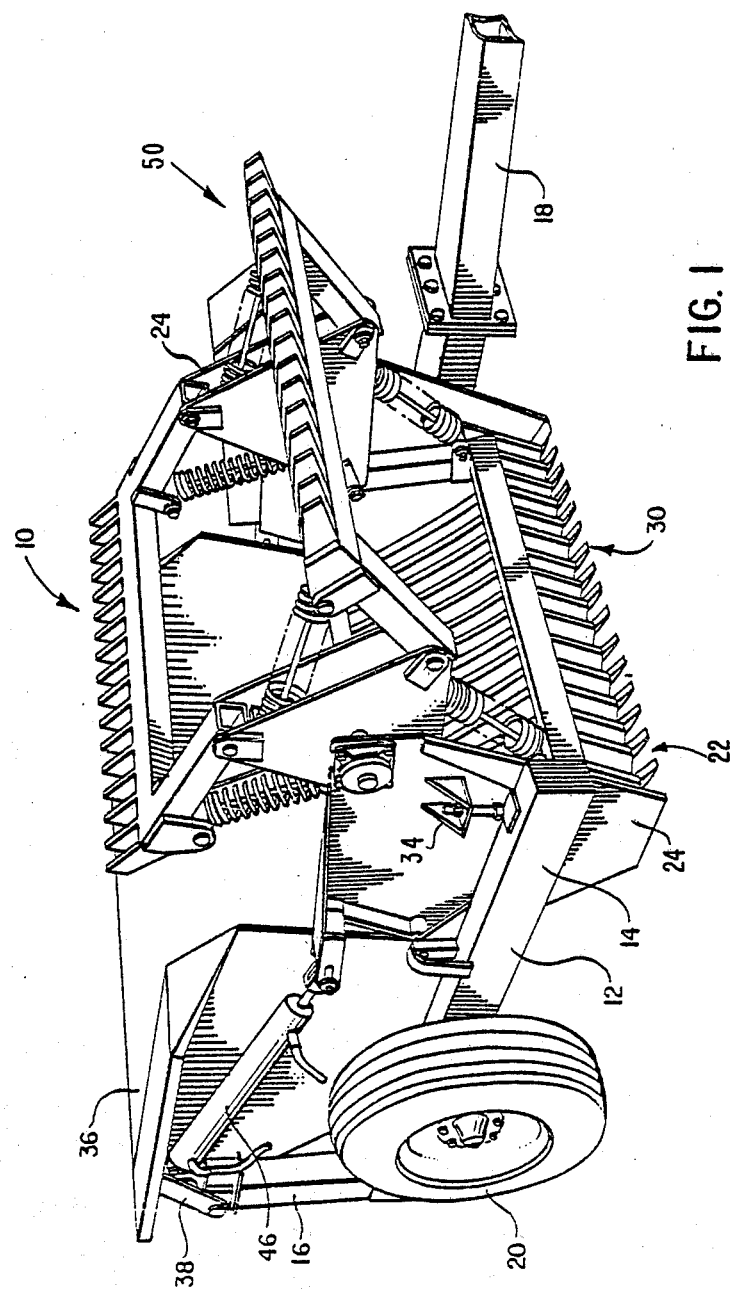
FIG. 1 is a perspective view of one embodiment of the present invention.
Figure 2:
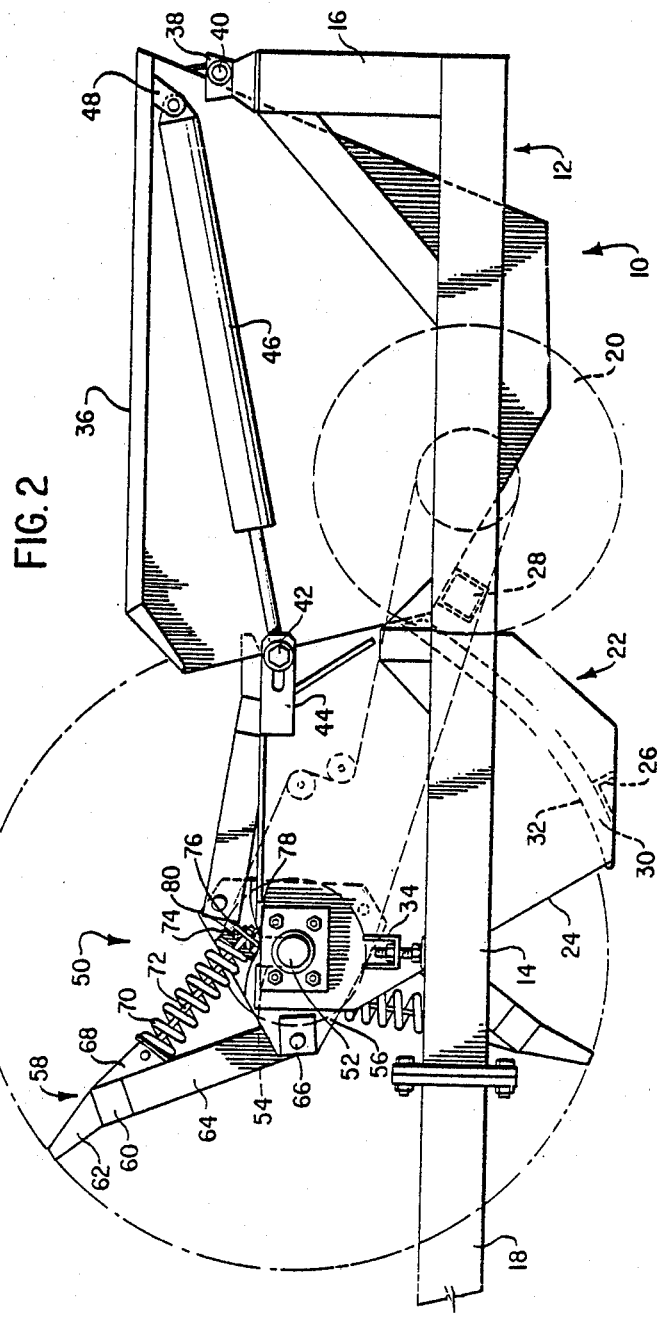
FIG. 2 is an elevation view of the apparatus in FIG. 1 showing the basic structural features of the invention.

Referring to FIGS. 1 and 2, the rock picker generally indicated at 10 has a U-shaped frame 12 comprising side members 14 interconnected by a rear portion, not shown, and a pair of uprights 16 secured to the rear terminal ends of the side members. One of the side members is connectable to a long tow-bar 18 which in turn is detachably secured to a tractor or other suitable vehicle for towing the device. A pair of wheels 20 are mounted on the side frame members 14.

Figure 3:
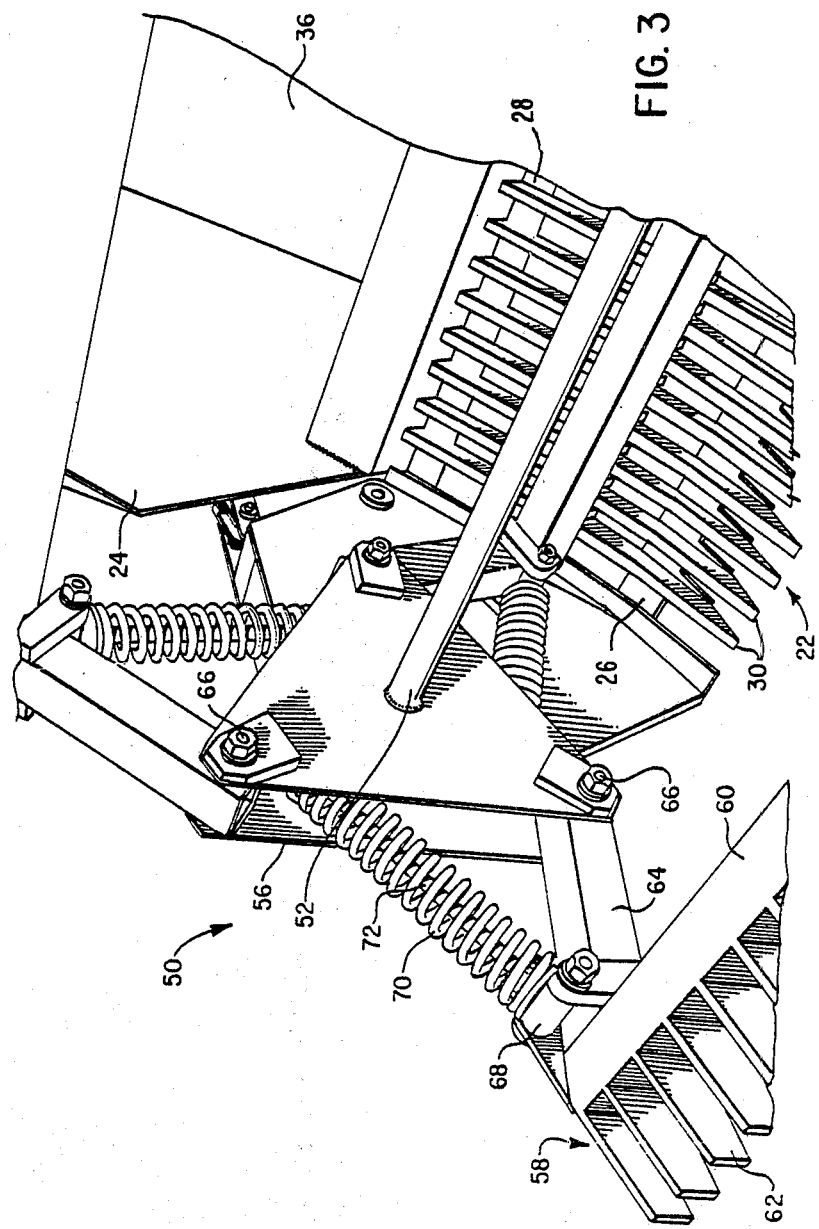
FIG. 3 is an enlarged portion of the grate area of the fork assembly.

A fork and reel assembly 22 comprises spaced side panels 24 interconnected by cross members 26 and 28 along the lower and rear portions thereof respectively. Cross members 26 and 28 support a grate 30 made up of a plurality of longitudinally extending, slightly curved tines 32 which are welded at one of their ends to the cross member 26 and at their other ends to the cross member 28. Preferably, as shown in FIG. 3, alternate tines are unsecured to the cross member 28 to provide additional flexibility in the grate for the loosening of small stones etc.

The fork 22 is suspended in the frame 12 by means of suitable brackets such as 34 which adjustably mount the panels 24 to the side members 14 of the frame.

A storage stone bucket 36 is suspended in the frame 12. The rear portion of the bucket 36 is pivotally mounted to the uprights 16 of the frame by virtue of brackets 38 and pins 40. The forward end of the bucket 36 is interconnected with the fork 22 by virtue of pivot pins 42 on the bucket and brackets 44 on the fork. Hydraulic actuators 46 interconnect the pivot pin 42 with brackets 48 near the upper rear corner of the bucket 36 so that when the actuator 46 is operated, the bucket will be dumped, the forward end of the bucket swinging upwardly and rearwardly about the pivot pins 40.

The reel assembly 50 comprises an axle 52 extending transversely of the fork 22 and is pivotally mounted for rotation in the panels 24 by means of suitable bearings 54. Adjacent each terminal end of the axle 52 are a pair of spaced side plates 56 which serve to mount the rakes 58. In this regard, each rake 58 comprises a head 60 having a plurality of spaced teeth 62 secured thereto throughout its length and a pair of legs 64 at either end, each leg being at right angles to the head and being pivotally secured between the side plates 56 by means of a pivot pin or bolt 66. At each end of the trailing side of the head 60 a bracket 68 pivotally mounts one end of a coil spring 70 and a coaxially positioned rod 72 therethrough, the other end of the spring 70 being mounted to a bracket 74 secured between the pair of side plates 56. The terminal end of the rod 72 extends freely through the bracket 74 and is provided with a flat washer or the like 76 of large diameter and a bolt head 78, a resilient cushion block 80 such as rubber being positioned between the disc 76 and the bracket 74. It will be appreciated from FIG. 2 that when the teeth 62 of the rake engage stones either in front of the grate 30 or in the teeth thereof, the legs 64 will be pivoted backwardly against the compression of the spring 70, the rod 72, and disc 76 extending through the bracket 74. When the teeth 62 are free of their load, the rake 58 will snap back to its FIG. 2 position under the power of the spring 70, this recoil action being absorbed by the cushion block 80.

It will be appreciated from FIG. 2 that the illustrated mounting of the rake 58 allows a small reel side plate 56 to be used so that there is substantial clearance as indicated by the distance a between the edges of the side plates 56 and the grate 30 so that jamming of stones between the side plates and the grate is inhibited. Also, the distance b between the pivot 66 of the leg and the terminal end of the rod 72 through the bracket 74 provides a good mechanical advantage to the operation of the rake teeth 62. The line of action of the spring force is a substantial distance from the bolt pivot point 66.

Figure 4:
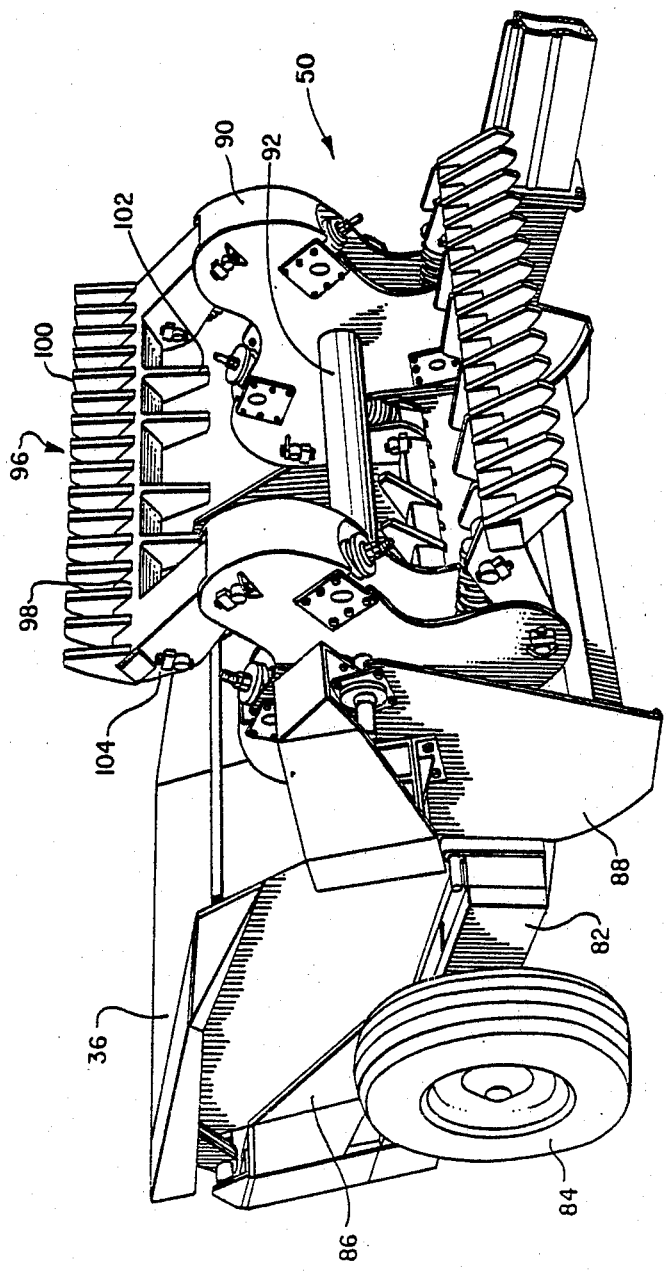
FIG. 4 is a perspective view of another embodiment of the present invention.
Figure 5:
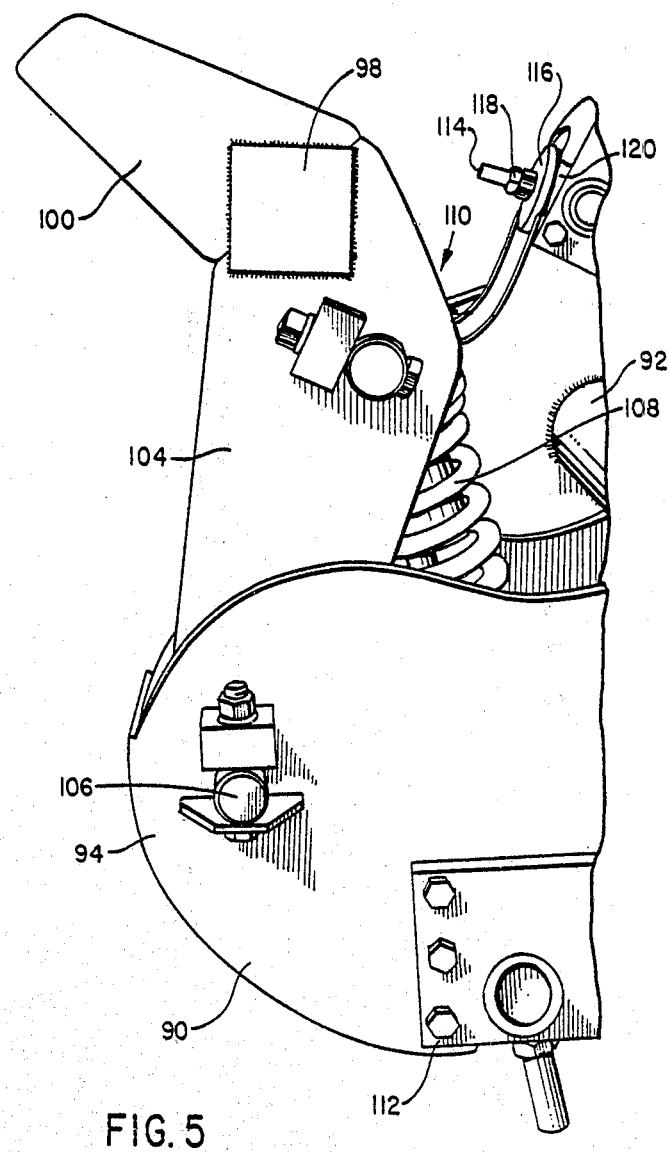
FIG. 5 is an enlarged view of the rake of the embodiment of FIG. 4.

Referring to FIGS. 4 and 5, a more heavily constructed embodiment of the present invention is disclosed and the heavier construction is evident from comparison of the reel assembly in particular with that of the rock picker in FIG. 1. In the FIG. 4 embodiment, a frame 82 has a pair of wheels 84 on either side thereof and the frame supports a rock bucket 86 interconnected with the fork side panels 88 in the same manner as the embodiment of FIG. 1. The reel assembly has two pairs of spaced side plates 90 interconnected by an axle 92 of substantial diameter. Each pair of side plates 90 is provided with a plurality of ears 94 which serve for the mounting of the legs and compression springs of several rakes. Each rake 96 comprises a head 98 having a plurality of spaced, forwardly extending teeth 100 together with a plurality of wider spaced rearwardly facing teeth 102. The provision of the teeth 102 ensures the contact of the rake with large stones to fling them backwardly into the bucket and thereby prevent the larger stones from rolling out over the top of the rake head 98.

As shown in FIG. 5, each rake 96 has a pair of spaced legs 104, each leg being pivotally secured to the side plate ears 94 by a pivot pin connection 106. The compression springs 108 which interconnect each leg to the associated ear 94 is of a substantially greater length than its associated leg 104 as is evident from FIGS. 4 and 5. Accordingly, the pivotal mounting for the spring 108 is made at one of its ends to the leg 104 as at 110 and the other end of the spring is mounted on the other side of the ear by way of a bracket 112. As in the first embodiment, the spring 108 has a central, concentrically positioned rod 114 with a flat disc washer 116 and bolt head 118 attached thereto so that when the rake 96 is bent backwardly against the compression of the spring 108, the rods 114 will be driven outwardly through the bracket 112 and the recoil will be absorbed by resilient bumper pads 120.

While the invention has been described in connection with specific embodiments thereof and in a specific use, various modifications will occur to those skilled in the art without departing from the spirit and scope of the invention as set forth in the appended claims.

The terms and expressions which have been employed in this specification are used as terms of description and not of limitation and there is no intention in the use of such terms and expressions to exclude any equivalents of the features shown and described or portions thereof but it is recognized that various modifications are possible within the scope of the invention as claimed.

We claim:

1. A rock picking apparatus comprising a mobile frame, a pair of spaced assembly support members on said frame, a fork and reel assembly on said support members of the frame for picking rocks from the ground and a dumpable stone storage bucket mounted on said frame behind said fork, said fork and reel assembly including an axle and a pair of spaced side plates at each end of the axle, and journalled for rotation in the assembly support members and supporting between them a plurality of rakes; each said rake having a pair of spaced legs pivotally mounted to said side plates; and compression spring means connecting the trailing sides of said rakes to said pairs of side plates and biasing said rakes to an operative position wherein one end of each spring means is pivotally secured to the trailing side of a rake and the other end of the spring means is supported between one of said pairs of side plates; the fork and reel assembly including a lower cross member extending between and secured to said assembly support members adjacent the lower ends thereof and a parallel, upper cross member also secured to the support members, said fork having a plurality of tines spaced along said cross members at right angles thereto to mesh with the teeth of said rakes; all of the tines being secured adjacent their lower ends to the lower cross members and alternate tines being secured adjacent their upper ends to the upper cross member.

2. Apparatus according to claim 1 wherein the compression spring includes a coaxially positioned rod secured at one end to said rake, and a cushion block on the other end of said rod for absorbing recoil shock of said spring.

3. Apparatus according to claims 1 or 2 wherein the length of the compression spring is substantially greater than the leg of said rake.

4. A rock picking apparatus comprising a mobile frame, a pair of spaced assembly support members on said frame, a fork and reel assembly on said support members of the frame for picking rocks from the ground and a dumpable stone storage bucket mounted on said frame behind said fork, said fork and reel assembly including an axle and a pair of spaced side plates at each end of the axle, and journalled for rotation in the assembly support members and supporting between them a plurality of rakes; each said rake having a pair of spaced legs pivotally mounted to said side plates; and compression spring means connecting the trailing sides of said rakes to said pairs of side plates and biasing said rakes to an operative position, wherein one end of each spring means is pivotally secured to the trailing side of a rake and the other end of the spring means is supported between one of said pairs of side plates.

* * * * *